US012764796B2

(12) United States Patent
Mu et al.

(10) Patent No.: US 12,764,796 B2
(45) Date of Patent: Oct. 13, 2026

(54) RESOURCE CONFIGURATION METHOD AND APPARATUS, COMMUNICATION DEVICE, AND STORAGE MEDIUM

(71) Applicant: Beijing Xiaomi Mobile Software Co., Ltd., Beijing (CN)

(72) Inventors: Qin Mu, Beijing (CN); Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 203 days.

(21) Appl. No.: 18/558,304

(22) PCT Filed: May 10, 2021

(86) PCT No.: PCT/CN2021/092902

§ 371 (c)(1),
(2) Date: Oct. 31, 2023

(87) PCT Pub. No.: WO2022/236639

PCT Pub. Date: Nov. 17, 2022

(65) Prior Publication Data

US 2024/0237081 A1 Jul. 11, 2024

(51) Int. Cl.

| | |
|---|---|
| ***H04W 74/0833*** | (2024.01) |
| ***H04W 24/10*** | (2009.01) |
| ***H04W 74/00*** | (2009.01) |

(52) U.S. Cl.

CPC ....... *H04W 74/0833* (2013.01); *H04W 24/10* (2013.01); *H04W 74/002* (2013.01)

(58) Field of Classification Search

CPC ............ H04W 74/0833; H04W 24/10; H04W 74/002; H04W 24/08; H04W 74/0808; H04W 52/0206; H04W 72/53; H04W 72/542; H04B 17/318; H04B 17/328; Y02D 30/70

See application file for complete search history.

(56) References Cited

U.S. PATENT DOCUMENTS

| | | | | |
|---|---|---|---|---|
| 2018/0184306 | A1* | 6/2018 | Xiong | H04W 36/08 |
| 2019/0342813 | A1* | 11/2019 | Fasil Abdul | H04W 74/0833 |
| 2021/0058971 | A1 | 2/2021 | MolavianJazi et al. | |
| 2021/0345293 | A1* | 11/2021 | Park | H04L 5/14 |

(Continued)

FOREIGN PATENT DOCUMENTS

| | | | |
|---|---|---|---|
| CN | 110366262 | A | 10/2019 |
| CN | 110708099 | A | 1/2020 |

(Continued)

OTHER PUBLICATIONS

Office Action issued by the Russian Federation Federal Institute of Industrial Property on May 27, 2024, in corresponding Application No. RU 2023131133/07, 5 pages.

(Continued)

*Primary Examiner* — Ayaz R Sheikh
*Assistant Examiner* — Mang Boi Thawng
(74) *Attorney, Agent, or Firm* — Finnegan, Henderson, Farabow, Garrett & Dunner, L.L.P.

(57) ABSTRACT

A method for resource configuration is performed by a user equipment (UE), and includes: determining physical random access channel (PRACH) resources based on a number of antennas of the UE and a channel measurement result.

17 Claims, 2 Drawing Sheets

(56) References Cited

U.S. PATENT DOCUMENTS

2022/0322256 A1* 10/2022 Cheng ................. H04W 56/001
2023/0239097 A1* 7/2023 He ......................... H04L 5/0048
370/329

FOREIGN PATENT DOCUMENTS

JP 2015-65603 A 4/2015
WO WO 2020/032643 A1 2/2020

OTHER PUBLICATIONS

Extended European Search Report Issued in Application No. 21941215.2 dated May 15, 2024, 81 pages.
International Search Report and Written Opinion of International Application No. PCT/CN2021/092902, dated Jan. 24, 2022, 12 pages.
Notice of the first review opinion, for Chinese Application No. 202180001507.7, issued on May 7, 2022, 10 pages.
Notice of the first review opinion issued by the Japanese Patent Office on Oct. 4, 2024, in corresponding Application No. JP 2023-568739, 13 pages.
OPPO, "Discussion on reduced number of UE Rx branches", R1-2102403, 3GPP TSG RAN WG1 #104b-e, e-Meeting, Apr. 12-20, 2021.
Office Action for KR Application No. 10-2023-7042655 dated Dec. 8, 2025.
Sharp, "Type A Pusch repetitions for Msg3", 3GPP TSG RAN WG1 Meeting #104-e, R1-2101549, e-Meeting, Jan. 25-Feb. 5, 2021, 4 pages.
Office Action for Korean Application No. 10-2023-7042655, dated Jun. 19, 2026, 15 pages.

* cited by examiner

RESOURCE CONFIGURATION METHOD AND APPARATUS, COMMUNICATION DEVICE, AND STORAGE MEDIUM

CROSS-REFERENCE TO RELATED APPLICATION

This application is the U.S. National Stage Application of International Application No. PCT/CN2021/092902, filed on May 10, 2021, the entire disclosure of which is incorporated herein by reference.

TECHNICAL FIELD

The disclosure relates to a field of wireless communication technologies, and specifically to a method and an apparatus for resource configuration, a communication device and a storage medium.

BACKGROUND

At present, 3GPP has carried out a research on a project of Reduced capability (REDCAP) NR devices. The project goal is to reduce the complexity of user equipment (UE) and cut costs while coexisting with UEs in the Release 15/Release 16 (R15/16).

The REDCAP NR devices have reduced antenna and bandwidth capabilities, which may affect signal reception capabilities of the REDCAP NR devices. There may be many problems for channel coverage in the original standards, and coverage enhancement solutions need to be introduced.

SUMMARY

According to a first aspect of the disclosure, a method for resource configuration is provided. The method is performed by a user equipment (UE) and includes: determining PRACH resources based on a number of antennas of the UE and a channel measurement result.

According to a second aspect of the disclosure, a UE is provided, which includes: a processor: and a memory for storing instructions executable by the processor. The processor is configured to determine physical random access channel (PRACH) resources based on a number of antennas of the UE and a channel measurement result.

According to a third aspect of the disclosure, a non-transitory computer-readable storage medium storing instructions is provided. When the instructions are executed by a processor of a user equipment (UE), the UE is caused to perform a method for resource configuration. The method includes: determining PRACH resources based on a number of antennas of a UE and a channel measurement result.

BRIEF DESCRIPTION OF THE DRAWINGS

The accompanying drawings, which are incorporated in and constitute a part of this specification, illustrate embodiments consistent with the disclosure and together with the description, serve to explain the principles of the disclosure.

DETAILED DESCRIPTION

The exemplary embodiments may be described in detail herein, examples of which are illustrated in the accompanying drawings. When the following description refers to the drawings, the same numbers in different drawings refer to the same or similar elements unless otherwise indicated. The implementations described in the following exemplary embodiments do not represent all the implementations consistent with the disclosure. Rather, they are merely exemplary embodiments of apparatus and methods consistent with some aspects of the disclosure as detailed in the appended claims.

The terminology used in the embodiments of the disclosure is for the purpose of describing specific embodiments only and is not intended to limit the embodiments of the disclosure. As used in the embodiments of this disclosure and the appended claims, the singular forms "a/an," "said" and "the" are intended to include the plural forms as well, unless the context clearly dictates otherwise. It will also be understood that the term "and/or" as used herein refers to and includes any and all possible combinations of one or more of the associated listed items.

It should be understood that although the terms first, second, third, etc. may be used to describe various information in the embodiments of the disclosure, the information should not be limited to these terms. These terms are only used to distinguish information of the same type from each other. For example, without departing from the scope of the embodiments of the disclosure, first information may also be called second information, and similarly, second information may also be called first information. Depending on the context, the word "if" as used herein may be interpreted as "upon" or "when" or "in response to determining."

In the method and the apparatus for resource configuration, the communication device and the storage medium provided by the embodiments of the disclosure, PRACH resources are determined based on a number of antennas and a channel measurement result of the UE. In this way, PRACH resources corresponding to a coverage enhancement level are determined jointly based on the number of antennas and the channel measurement result of the UE, which reduces a deviation caused by determining the coverage enhancement requirements based only on the channel measurement result, improves the accuracy of selecting PRACH resources indicating coverage enhancement, and reduces a problem of unstable signal transmission due to using too low coverage enhancement level or high power consumption caused by using too high coverage enhancement level.

Figure 1:
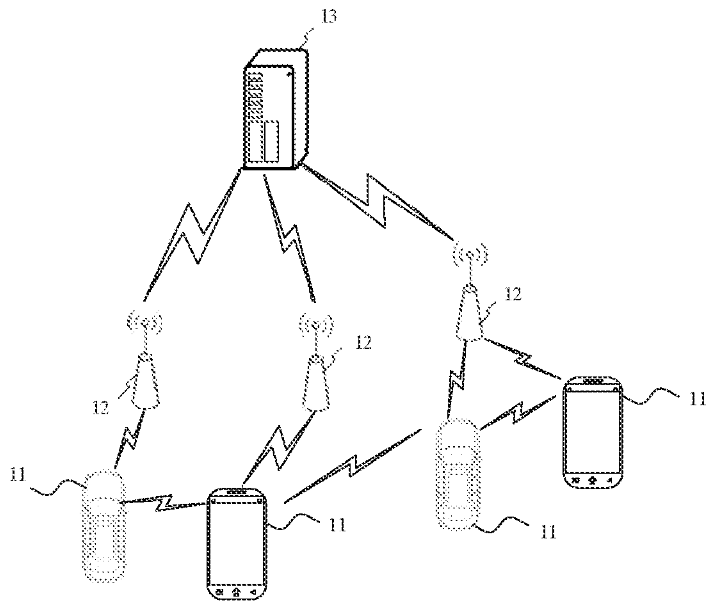
FIG. 1 is a structural diagram illustrating a wireless communication system according to an exemplary embodiment.

Referring to FIG. 1, it illustrates a structural diagram of a wireless communication system according to an embodiment of the disclosure. As shown in FIG. 1, the wireless communication system is a communication system based on cellular mobile communication technology. The wireless communication system may include several terminals 11 and several base stations 12.

The terminal 11 may be a device that provides voice and/or data connectivity to a user. The terminal 11 may communicate with one or more core networks via a radio access network (RAN), and the terminal 11 may be an Internet of Things terminal, such as a sensor device, a mobile phone (or called a "cellular" phone) and a computer having an IoT terminal. For example, the terminal 11 may be a fixed, portable, pocket, hand-held, built-in computer or vehicle-mounted device. For example, the terminal 11 may be a station (STA), a subscriber unit, a subscriber station, a mobile station, a mobile, a remote station, an access point, a remote terminal, an access terminal, a user terminal, a user agent, a user device, or a user equipment (UE). Alternatively, the terminal 11 may also be a device of an unmanned aerial vehicle. Alternatively, the terminal 11 may also be a vehicle-mounted device, for example, a trip computer with a wireless communication function, or a wireless communication device connected externally to the trip computer. Alternatively, the terminal 11 may also be a roadside device, for example, it may be a street lamp, a signal lamp, or other roadside devices with a wireless communication function.

The base station 12 may be a network-side device in a wireless communication system. The wireless communication system may be the 4th generation mobile communication (4G) system, also known as a long term evolution (LTE) system. Alternatively, the wireless communication system may also be a 5G system, also known as new radio (NR) system or 5G NR system. Alternatively, the wireless communication system may also be a next-generation system of the 5G. The access network in the 5G system may be called a new generation-radio access network (NG-RAN). Alternatively, the wireless communication system may be a machine type communication (MTC) system.

The base station 12 may be an evolved base station (eNB) used in the 4G system. Alternatively, the base station 12 may also be a base station (gNB) that adopts a centralized distributed architecture in a 5G system. When the base station 12 adopts the centralized distributed architecture, it usually includes a central unit (CU) and at least two distributed units (DUs). The CU is provided with protocol stacks of a packet data convergence protocol (PDCP) layer, a radio link control (RLC) protocol layer, and a medium access control (MAC) layer. The DU is provided with a protocol stack of a physical (PHY) layer. The specific implementation of the base station 12 is not limited in this embodiment of the disclosure.

A wireless connection may be established between the base station 12 and the terminal 11 through a wireless air interface. In different embodiments, the wireless air interface is a wireless air interface based on the fourth generation mobile communication network technology (4G) standard or a wireless air interface based on the fifth generation mobile communication network technology (5G) standard. For example, the wireless air interface is a new air interface. Alternatively, the wireless air interface may also be a wireless air interface based on a 5G next-generation mobile communication network technology standard.

In some embodiments, an end-to-end (E2E) connection may also be established between the terminals 11, for example, vehicle-to-vehicle (V2V) communication, vehicle to infrastructure (V2I) communication and vehicle to pedestrian (V2P) communication and other communication scenes in vehicle-to-everything (V2X) communication.

In some embodiments, the above wireless communication system may further include a network management device 13.

Several base stations 12 are respectively connected to the network management device 13. The network management device 13 may be a core network device in a wireless communication system. For example, the network management device 13 may be a mobility management entity (MME) in an evolved packet core (EPC). Alternatively, the network management device may also be other core network devices, such as a serving gateway (SGW), a public data network gateway (PGW), a policy and charging rules function (PCRF) or a home subscriber server (HSS), etc. The implementation of the network management device 13 is not limited in this embodiment of the disclosure.

The execution body involved in the embodiments of the disclosure include, but are not limited to: a UE such as a mobile phone terminal using cellular mobile communication network technology for wireless communication, and the like.

An application scenario of the embodiment of the disclosure is that uplink channels of UE such as a REDCAP UE needs coverage enhancement in some cases, for example: Message 3 (Msg 3) in four-step random access, a physical uplink control channel (PUCCH), unicast physical uplink shared channel (PUSCH).

The specific PRACH resources can be divided and used by the UE to indicate coverage enhancement means that need to be used by the base station in subsequent uplink transmissions. Alternatively, the terminal may further request the network to perform a certain degree of coverage enhancement. The network may infer the channel quality of the UE based on the detected PRACH resources or further understand a coverage enhancement degree required by the UE.

As shown in Table 1, the UE may determine a corresponding PRACH resource based on a measurement result of SS-RSRP (i.e., a RSRP threshold range where the RSRP value is located).

TABLE 1

| RSRP | PRACH resource | Required Coverage |
|---|---|---|
| R1~R2 | Set#1 | Coverage enhance Level 1 |
| R2~R3 | Set#2 | Coverage enhance Level 2 |
| >R3 | Set#3 | No Coverage enhancement |

In the current network, different types of UEs exist at the same time. For example, enhanced mobile broadband (eMBB) UEs and Redcap UEs exist in the network at the same time. Different types of UEs have different numbers of receiving antennas. For example, there are 1 receiving antenna (1Rx), 2 receiving antennas (2Rx) and 4 receiving antennas (4Rx) in the network at the same time. When the UEs with different receiving antennas perform RSRP measurement, the RSRP measured by a UE with more antennas is usually high, that is, RSRP-1Rx<RSRP-2Rx<RSRP-4Rx.

Each of UEs with different receiving antennas may have only one transmitting antenna (Tx), that is, UEs with different receiving antennas actually have the same uplink coverage performance. If different UEs use the different numbers of Rx to perform RSRP measurements, and select PRACH resources to represent coverage enhancement requirements based on the measured RSRP, then the selected PRACH resources cannot actually represent accurate coverage enhancement requirements. For example, if the RSRP measured by 4 Rx is higher than the RSRP measured by 1 Rx, the PRACH resources selected based on the two RSRPs are also different according to the current rules and the coverage enhancement requirements represented by the PRACH resources are also different. As a result, the uplink coverage enhancement degree of UE with the 4Rx may be not enough, or the uplink coverage of UE with the 1Rx is over-enhanced.

Therefore, there is a problem that needs to be solved urgently about how to select PRACH resources for UEs with different receiving antennas, and how to represent the accurate coverage enhancement requirements.

Figure 2:
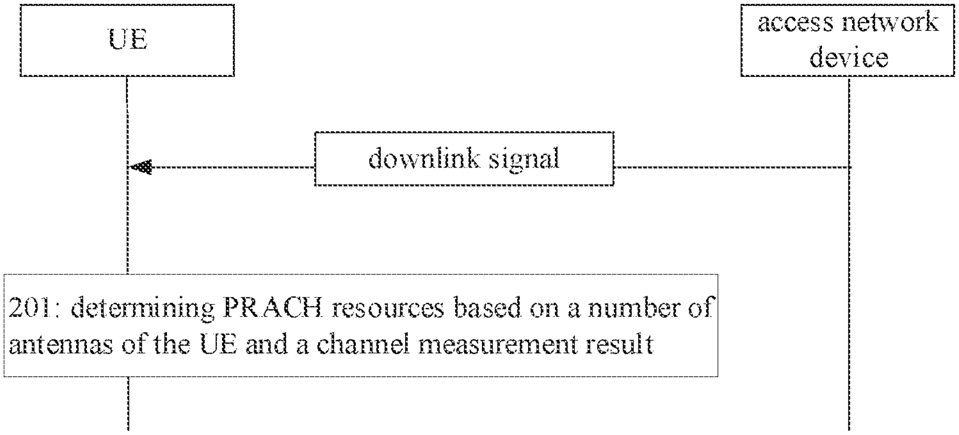
FIG. 2 is a flowchart illustrating a method for resource configuration according to an exemplary embodiment.

As shown in FIG. 2, the exemplary embodiment provides a method for resource configuration. The method for resource configuration may be applied to a UE in wireless communication. The method includes the following step at 201.

At 201, PRACH resources are determined based on a number of antennas of the UE and a channel measurement result.

Here, the step of the method in this embodiment may be performed by the UE, such as a REDCAP UE and an eMBB UE.

Here, different PRACH resources are used to indicate different coverage enhancement levels to a base station. That is, different PRACH resources may indicate different coverage enhancement levels to the base station. The base station may determine a coverage enhancement level for uplink transmission of the UE according to the PRACH resources used by the UE. The uplink transmission of UE includes but is not limited to: uplink transmission of random access messages such as the Msg 3, uplink transmission using PUCCH resource transmission information and/or PUSCH resource transmission information, etc.

The coverage enhancement level may be an uplink coverage enhancement level. For example, it may be a coverage enhancement level for Msg 3 transmission, and/or a coverage enhancement level for transmission using PUCCH resources and/or PUSCH resources.

The UE may use different PRACH resources to indicate different coverage enhancement levels to the base station.

The UE may use the receiving antenna to perform channel measurement and thus obtain a channel measurement result. The UE may use a transmitting antenna to transmit uplink data. The coverage enhancement level is associated with the transmitting antenna.

In an embodiment, different PRACH resources may include: different time domain resources, and/or different frequency domain resources, and/or different random access preambles, etc.

Here, the channel measurement result may be a measurement result obtained by the UE performing channel measurement. The UE may measure downlink signals of the base station, such as a tracking reference signal (TRS) and/or a channel state information reference signal (CSI-RS), etc., to obtain a channel measurement result. The number of antennas of the UE may include a number of antennas used for channel measurement.

In an embodiment, the channel measurement result includes a reference signal received power (RSRP) value.

The RSRP value is a key parameter of wireless signal strength and is an average of signal powers received on all resource elements (REs) carrying reference signals within a certain symbol. The RSRP values obtained by RSRP measurement via different numbers of antennas may be different. The antenna used for RSRP measurement may be the receiving antenna of the UE.

In the related art, the UE does not consider a number of antennas used for RSRP measurement, but determines PRACH resources indicating a coverage enhancement level based on the measured RSRP value. As such, the indicated coverage enhancement level does not meet the actual coverage enhancement requirements.

In this embodiment, the PRACH resource indicating the coverage enhancement level may be determined jointly based on the number of antennas used for RSRP measurement and the RSRP value.

Since the RSRP values measured by different numbers of antennas are different, the coverage enhancement requirements cannot be accurately reflected. Therefore, by compensating for the RSRP values obtained from RSRP measurements via different numbers of antennas, and/or adjusting an RSRP threshold range for determining PRACH resources, the coverage enhancement level associated with the determined PRACH resources may meet actual requirements.

For example, since the RSRP value measured by the UE with 4 receiving antennas is higher than the RSRP value measured by the UE with 1 receiving antenna, the PRACH resources selected for the two RSRP values according to the rules in the related art are also different, and thus the coverage enhancement requirements associated with the PRACH resources are also different. Generally, a lower coverage enhancement level may be selected for a UE with a higher RSRP value, and a higher coverage enhancement level may be selected for a UE with a lower RSRP value. Assuming that both UEs have the same number of transmitting antennas for uplink transmission, when a number of receiving antennas used to measure the RSRP value is not distinguished during the RSRP measurement and the PRACH resources are determined based only on the RSRP value, a consequence may be caused that an uplink coverage enhancement degree of the UE with 4 receiving antennas is not enough, or an uplink coverage of the UE with 1 receiving antenna is over-enhanced.

Here, the measured RSRP value may be compensated based on the number of antennas for RSRP measurement, so that the coverage enhancement level determined based on the compensated RSRP value may meet the actual requirements for uplink coverage. The RSRP threshold ranges corresponding to different PRACH resources may also be adjusted according to the number of antennas for RSRP measurement, so that the coverage enhancement level determined based on the RSRP values measured by different numbers of antennas may meet the actual requirements for uplink coverage.

In this way, PRACH resources corresponding to the coverage enhancement level are determined jointly based on the number of antennas and the channel measurement result of the UE, which reduces a deviation caused by determining the coverage enhancement requirements based only on the channel measurement result, improves the accuracy of selecting PRACH resources indicating coverage enhancement, and reduces a problem of unstable signal transmission due to using too low coverage enhancement level or high power consumption caused by using too high coverage enhancement level.

In an embodiment, determining PRACH resources based on the number of antennas of the UE and the channel measurement result includes: determining to use one antenna for channel measurement; and determining the PRACH resources based on a channel measurement result obtained by the channel measurement.

Here, the channel measurement may be an RSRP measurement, and the channel measurement result may be an RSRP value. It may be specified in a communication protocol and other methods that when the UE uses the RSRP value to determine the PRACH resources indicating the coverage enhancement requirement, only one antenna may be used for RSRP measurement.

The RSRP measurement is performed through one antenna, so that UEs with different numbers of antennas may determine the RSRP value by using a relatively close signal receiving capability. In the case of the same signal strength, the RSRP values measured by RSRP measurement are closer, and a unified standard (i.e., an RSRP threshold range) may be used to determine the PRACH resources indicating the coverage enhancement level. This enables the determined coverage enhancement level to meet the actual coverage enhancement requirements.

In an embodiment, determining PRACH resources based on the number of antennas of the UE and the channel measurement result includes: determining a corresponding channel measurement result threshold range based on the number of antennas for channel measurement; and determining the PRACH resources from a PRACH resource set corresponding to the channel measurement result threshold range where the measured channel measurement result is located, in which one PRACH resource set includes at least one PRACH resource.

The same UE or different UEs may use different numbers of antennas to perform RSRP measurement. Corresponding RSRP threshold ranges may be set for different numbers of antennas. The set RSRP threshold ranges corresponding to different numbers of antennas may be the same or different. The same number of antennas may have a plurality of RSRP threshold ranges, and PRACH resource sets corresponding to different RSRP threshold ranges may be different.

PRACH resources in the same PRACH resource set are associated with the same coverage enhancement level. Therefore, different RSRP threshold ranges correspond to different coverage enhancement level requirements.

The UE may determine an RSRP threshold range based on the number of antennas used for RSRP measurement, and determine PRACH resources indicating the coverage enhancement level based on the RSRP threshold range where the measured RSRP value is located.

In this way, an RSRP threshold range corresponding to a number of antennas may be set for different antenna numbers, and the accurate PRACH resources are then determined by comparing the obtained RSRP value with the RSRP threshold range, i.e., the accurate coverage enhancement level is determined. This reduces a problem of unstable signal transmission due to using too low coverage enhancement level or high power consumption caused by using too high coverage enhancement level.

In an embodiment, for different numbers of antennas, channel measurement result threshold ranges corresponding to a same PRACH resource set are different.

Here, for different numbers of antennas used for RSRP measurement, different RSRP threshold ranges may be used. The same number of antennas may have a plurality of RSRP threshold ranges corresponding to different PRACH resource sets.

In an example, as shown in Table 2, when 1 antenna is used for RSRP measurement, RSRP threshold ranges corresponding to 3 PRACH resource sets (i.e., PRACH set #1, PRACH set #2 and PRACH set #3) are R1~R2, R2~R3 and >R3, respectively. When 2 antennas are used for RSRP measurement, RSRP threshold ranges corresponding to 3 PRACH resource sets are R1'-R2', R2'-R3' and >R3' respectively. When 4 antennas are used for RSRP measurement, RSRP threshold ranges corresponding to 3 PRACH resource sets are R1"-R2", R2"-R3" and >R3" respectively. R1, R2, R3, R1'. R2', R3', R1", R2", and R3" respectively represent RSRP thresholds.

TABLE 2

| UE type | RSRP Range | PRACH Resource | Requested Coverage enhancement level |
|---|---|---|---|
| UE with 1Rx | R1~R2 | PRACH set#1 | Level 1 |
| UE with 2Rx | R1'~R2' | | |
| UE with 4Rx | R1"~R2" | | |
| UE with 1Rx | R2~R3 | PRACH set#2 | Level 2 |
| UE with 2Rx | R1'~R3' | | |
| UE with 4Rx | R2"~R3" | | |
| UE with 1Rx | >R3 | PRACH set#3 | Level 3 |
| UE with 2Rx | >R3' | | |
| UE with 4Rx | >R3" | | |

In this way, different RSRP threshold ranges are used for different numbers of antennas, which reduces the impact on the determination of PRACH resources due to differences in RSRP values measured by different numbers of antennas and improves the accuracy of determining the PRACH resources.

In an embodiment, channel measurement result threshold ranges corresponding to different numbers of antennas are the same, and the same channel measurement result threshold range corresponding to the different numbers of antennas corresponds to different PRACH resource sets.

Here, for different numbers of antennas used for RSRP measurement, the same RSRP threshold ranges may be used and the same RSRP threshold ranges for different numbers of antennas correspond to different PRACH resources. The same number of antennas may correspond to a plurality of RSRP threshold ranges. The plurality of RSRP threshold ranges correspond to different PRACH resource sets.

In an example, as shown in Table 3, when 1 antenna or 2 antennas or 4 antennas is/are used for RSRP measurement, the RSRP threshold ranges are all <R1, R1~R2, and >R2. However, for different numbers of antennas, the same RSRP threshold range corresponds to different PRACH resource sets. That is, even if the RSRP values measured by different numbers of antennas are located in the same RSRP threshold range, the determined PRACH resource set are different, that is, the selected coverage enhancement levels are different.

TABLE 3

| UE type | Rx | RSRP | PRACH | Requested Coverage enhancement level |
|---|---|---|---|---|
| Redcap | 1Rx | <R1 | PRACH set#1 | Level 1 |
| | | R1~R2 | PRACH set#2 | Level 2 |
| | | >R2 | PRACH set#3 | Level 3 |
| | 2Rx | <R1 | PRACH set#4 | Level 1' |
| | | R1~R2 | PRACH set#5 | Level 2' |
| | | >R2 | PRACH set#6 | Level 3' |
| eMBB | 4Rx | <R1 | PRACH set#7 | Level 1" |
| | | R1~R2 | PRACH set#8 | Level 2" |
| | | >R2 | PRACH set#9 | Level 3" |

In this way, for different numbers of antennas, the same RSRP threshold range corresponds to different PRACH resources, which reduces the problem of inaccurate PRACH resource selection caused by using the same PRACH resource selection criteria without distinguishing the number of antennas, and improves the accuracy of PRACH resource determination.

In an embodiment, channel measurement result threshold ranges corresponding to different numbers of antennas are different, and the channel measurement result threshold ranges corresponding to the different numbers of antennas correspond to different PRACH resource sets.

Here, for different numbers of antennas used for RSRP measurement, different RSRP threshold ranges may be used and the RSRP threshold ranges for different numbers of antennas correspond to different PRACH resources.

In an example, as shown in Table 4, when 1 antenna or 2 antennas or 4 antennas is/are used for RSRP measurement, their RSRP threshold ranges are all different, and each PRACH resource corresponding to each RSRP threshold range may also be varied.

TABLE 4

| UE type | Rx | RSRP | PRACH | Requested Coverage enhancement level |
|---|---|---|---|---|
| Redcap | 1Rx | <R1 | PRACH set#1 | Level 1 |
| | | R1~R2 | PRACH set#2 | Level 2 |
| | | >R2 | PRACH set#3 | Level 3 |
| | 2Rx | <R1' | PRACH set#4 | Level 1' |
| | | R1'~R2' | PRACH set#5 | Level 2' |
| | | >R2' | PRACH set#6 | Level 3' |
| eMBB | 4Rx | <R1" | PRACH set#7 | Level 1" |
| | | R1"~R2" | PRACH set#8 | Level 2" |
| | | >R2" | PRACH set#9 | Level 3" |

In this way, for different numbers of antennas, independent RSRP threshold ranges are established, and each PRACH resource corresponds to each RSRP threshold range. This improves the pertinence of PRACH resource selection, thereby improving the accuracy of PRACH resource selection.

A specific example is provided below in combination with any of the above embodiments.

This example provides four methods for determining PRACH resources.

Method 1: it is predefined in a protocol that when the RSRP is used by a UE to determine the PRACH resources and then indicates the coverage enhancement level, only 1Rx is used for measurement.

Method 2: As shown in Table 2, when the UE determines PRACH resources and/or determines the requested uplink coverage enhancement level, different receiving antennas use different RSRP threshold ranges.

Method 3: As shown in Table 3, when the UE determines the PRACH resources and/or determines the requested uplink coverage enhancement level, UEs with different receiving antennas in the same RSRP threshold range use different PRACH resources.

Method 4: As shown in Table 4, when the UE determines the PRACH resources and/or determines the requested uplink coverage enhancement level, both RSRP threshold ranges and corresponding PRACH resources used by UEs with different receiving antennas are different.

Figure 3:
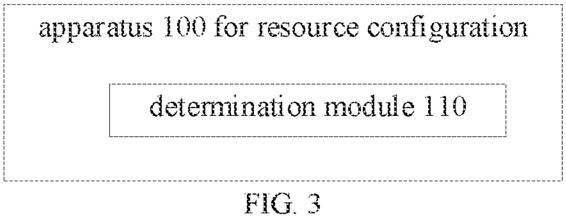
FIG. 3 is a block diagram illustrating an apparatus for resource configuration according to an exemplary embodiment.

According to an embodiment, an apparatus for resource configuration is also provided, which can be applied to a UE. As shown in FIG. 3, the apparatus 100 includes a determination module 110.

The determination module 110 is configured to determine PRACH resources based on a number of antennas of the UE and a channel measurement result.

In an embodiment, the determination module 110 is specifically configured to: determine to use one antenna for channel measurement; and determine the PRACH resources based on a channel measurement result obtained by the channel measurement.

In an embodiment, the determination module 110 is specifically configured to: determine a corresponding channel measurement result threshold range based on a number of antennas for channel measurement; and determine the PRACH resources from a PRACH resource set corresponding to the channel measurement result threshold range where a measured channel measurement result is located, in which one PRACH resource set includes at least one PRACH resource.

In an embodiment, channel measurement result threshold ranges corresponding to a same PRACH resource set are different for different numbers of antennas.

In an embodiment, channel measurement result threshold ranges corresponding to different numbers of antennas are the same, and the same channel measurement result threshold range corresponding to the different numbers of antennas corresponds to different PRACH resource sets.

In an embodiment, channel measurement result threshold ranges corresponding to different numbers of antennas are different, and the different channel measurement result threshold ranges corresponding to the different numbers of antennas correspond to different PRACH resource sets.

In an embodiment, the channel measurement result includes a RSRP value.

In an exemplary embodiment, the determination module 110 etc. may be implemented by one or more central processing units (CPUs), graphics processing units (GPUs), baseband processors (BPs), application specific integrated circuits (ASICs), digital signal processors (DSPs), programmable logic devices (PLDs), complex programmable logic devices (CPLDs), field-programmable gate arrays (FPGAs), general-purpose processors, controllers, micro controller units (MCUs), microprocessors, or other electronic components to perform the aforementioned method.

Figure 4:
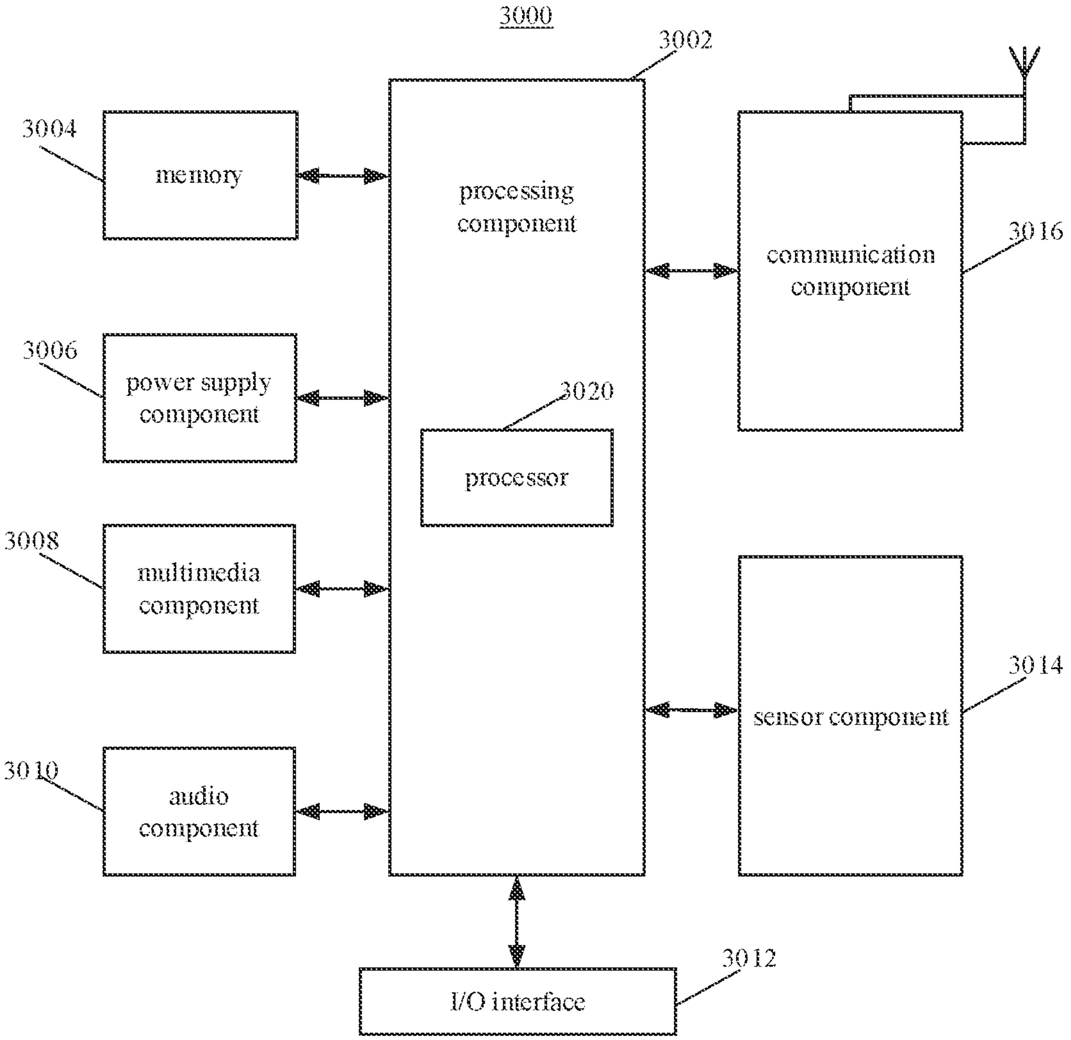
FIG. 4 is a block diagram illustrating a device for resource configuration according to an exemplary embodiment.

FIG. 4 is a block diagram illustrating a device 3000 for resource configuration according to an exemplary embodiment. For example, the device 3000 may be a mobile phone, a computer, a digital broadcast terminal, a messaging device, a game console, a tablet device, a medical device, a fitness device, a personal digital assistant, and the like.

Referring to FIG. 4, the device 3000 may include one or more of the following components: a processing component 3002, a memory 3004, a power component 3006, a multimedia component 3008, an audio component 3010, an input/output (I/O) interface 3012, a sensor component 3014, and a communication component 3016.

The processing component 3002 generally controls overall operations of the device 3000, such as those associated with display, telephone calls, data communications, camera operations, and recording operations. The processing component 3002 may include one or more processors 3020 to execute instructions to perform all or some of the steps of the methods described above. Moreover, the processing component 3002 may include one or more modules that facilitate interactions between the processing component 3002 and other components. For example, the processing component 3002 may include a multimedia module to facilitate interactions between the multimedia component 3008 and the processing component 3002.

The memory 3004 is configured to store various types of data to support operations of the device 3000. Examples of such data include instructions for any application or method operating on the device 3000, contact data, phonebook data, messages, pictures, videos, and the like. The memory 3004 may be implemented by any type of volatile or nonvolatile storage device or their combination, such as a static random-access memory (SRAM), an electrically-erasable programmable read only memory (EEPROM), an erasable programmable read only memory (EPROM), a programmable read only memory (PROM), a read only memory (ROM), a magnetic memory, a flash memory, a magnetic or optical disk.

The power component 3006 provides power to various components of the device 3000. The power component 3006 may include a power management system, one or more power sources, and any other components associated with the generation, management, and distribution of power in the device 3000.

The multimedia component 3008 includes a screen providing an output interface between the device 3000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a duration and a pressure associated with the touch or swipe action. In some embodiments, the multimedia component 3008 includes a front-facing camera and/or a rear-facing camera. When the device 3000 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 3010 is configured to output and/or input audio signals. For example, the audio component 3010 includes a microphone (MIC) that is configured to receive external audio signals when the device 3000 is in an operating mode, such as a call mode, a recording mode, and a voice recognition mode. The received audio signal may be further stored in the memory 3004 or transmitted via the communication component 3016. In some embodiments, the audio component 3010 also includes a speaker for outputting audio signals.

The I/O interface 3012 provides an interface between the processing component 3002 and peripheral interface modules, such as a keyboard, a click wheel, buttons, and the like. The buttons may include, but are not limited to, a home button, a volume button, a starting button, and a locking button.

The sensor component 3014 includes one or more sensors to provide state assessments of various aspects of the device 3000. For instance, the sensor component 3014 may detect an open/closed state of the device 3000, relative positioning of components, e.g., the display and the keypad, of the device 3000, a change in position of the device 3000 or a component of the device 3000, a presence or absence of user contact with the device 3000, an orientation or an acceleration/deceleration of the device 3000, and a change in temperature of the device 3000. The sensor component 3014 may include a proximity sensor configured to detect the presence of nearby objects without any physical contact. The sensor component 3014 may also include a light sensor, such as a complementary metal oxide semiconductor (CMOS) or a charge-coupled device (CCD) image sensor, for use in imaging applications. In some embodiments, the sensor component 3014 may also include an accelerometer sensor, a gyroscope sensor, a magnetic sensor, a pressure sensor, or a temperature sensor.

The communication component 3016 is configured to facilitate communication, wired or wirelessly, between the device 3000 and other devices. The device 3000 can access a wireless network based on a communication standard, such as WiFi, 2G, or 3G, or their combination. In an exemplary embodiment, the communication component 3016 receives a broadcast signal or broadcast associated information from an external broadcast management system via a broadcast channel. In an exemplary embodiment, the communication component 3016 further includes a near field communication (NFC) module to facilitate short-range communications. For example, the NFC module may be implemented based on a radio frequency identification (RFID) technology, an infrared data association (IrDA) technology, an ultra-wide band (UWB) technology, a Bluetooth (BT) technology, and other technologies.

In exemplary embodiments, the device 3000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method.

In exemplary embodiments, there is also provided a non-transitory computer readable storage medium including instructions, such as included in the memory 3004, executable by the processor 3020 in the device 3000, for performing the above method. For example, the non-transitory computer readable storage medium may be a ROM, a random access memory (RAM), a CD-ROM, a magnetic tape, a floppy disc, an optical data storage device, and the like.

Those skilled in the art will be aware of other implementations of the disclosure after considering the specification and practicing the disclosure disclosed herein. The disclosure is intended to cover any variations, uses, or adaptive changes of the disclosure, which follow the general principles of the disclosure and include common knowledge or conventional technical means in the technical field not disclosed herein. The description and the embodiments are to be regarded as exemplary, and the true scope of the disclosure are indicated in the following claims.

It should be understood that the disclosure is not limited to the precise structures described above and illustrated in the accompanying drawings, and that various modifications and changes may be made without departing from its scope. The scope of the disclosure is limited only by the appended claims.

What is claimed is:

1. A method for resource configuration, performed by a user equipment (UE), the method comprising:

determining physical random access channel (PRACH) resources based on a number of antennas of the UE and a channel measurement result;

wherein determining the PRACH resources comprises:

determining a plurality of channel measurement result thresholds based on a number of antennas for channel measurement; and determining the PRACH resources from a target PRACH resource set, wherein the target PRACH resource set corresponds to a target channel measurement result threshold where a measured channel measurement result is located among the plurality of channel measurement result thresholds, wherein one PRACH resource set comprises at least one PRACH resource.

2. The method according to claim 1, wherein determining PRACH resources based on the number of antennas of the UE and the channel measurement result comprises:

determining to use one antenna for channel measurement; and determining the PRACH resources based on a channel measurement result obtained by the channel measurement.

3. The method according to claim 1, wherein channel measurement result thresholds corresponding to a same PRACH resource set are different for different numbers of antennas.

4. The method according to claim 1, wherein channel measurement result thresholds corresponding to different numbers of antennas are the same, and the same channel measurement result threshold corresponding to the different numbers of antennas corresponds to different PRACH resource sets.

5. The method according to claim 1, wherein channel measurement result thresholds corresponding to different numbers of antennas are different, and the different channel measurement result thresholds corresponding to the different numbers of antennas correspond to different PRACH resource sets.

6. The method according to claim 1, wherein the channel measurement result comprises a reference signal received power (RSRP) value.

7. A user equipment (UE), comprising:

a processor; and a memory for storing instructions executable by the processor;

wherein the processor is configured to determine a plurality of channel measurement result thresholds based on a number of antennas for channel measurement; and determine physical random access channel (PRACH) resources from a target PRACH resource set, wherein the target PRACH resource set corresponds to a target channel measurement result threshold where a measured channel measurement result is located among the plurality of channel measurement result thresholds, wherein one PRACH resource set comprises at least one PRACH resource.

8. The UE according to claim 7, wherein the processor is further configured to:

determine to use one antenna for channel measurement; and determine the PRACH resources based on a channel measurement result obtained by the channel measurement.

9. The UE according to claim 7, wherein channel measurement result thresholds corresponding to a same PRACH resource set are different for different numbers of antennas.

10. The UE according to claim 7, wherein channel measurement result thresholds corresponding to different numbers of antennas are the same, and the same channel measurement result threshold corresponding to the different numbers of antennas corresponds to different PRACH resource sets.

11. The UE according to claim 7, wherein channel measurement result thresholds corresponding to different numbers of antennas are different, and the different channel measurement result thresholds corresponding to the different numbers of antennas correspond to different PRACH resource sets.

12. The UE according to claim 7, wherein the channel measurement result comprises a reference signal received power (RSRP) value.

13. A non-transitory computer-readable storage medium storing instructions that, when executed by a processor of a user equipment (UE), cause the UE to perform a method for resource configuration, the method comprising:

determining physical random access channel (PRACH) resources based on a number of antennas of the UE and a channel measurement result;

wherein determining the PRACH resources comprises:

determining a plurality of channel measurement result thresholds based on a number of antennas for channel measurement; and determining the PRACH resources from a target PRACH resource set, wherein the target PRACH resource set corresponds to a target channel measurement result threshold where a measured channel measurement result is located among the plurality of channel measurement result thresholds, wherein one PRACH resource set comprises at least one PRACH resource.

14. The storage medium according to claim 13, wherein determining PRACH resources based on the number of antennas of the UE and the channel measurement result comprises:

determining to use one antenna for channel measurement; and determining the PRACH resources based on a channel measurement result obtained by the channel measurement.

15. The storage medium according to claim 13, wherein channel measurement result thresholds corresponding to a same PRACH resource set are different for different numbers of antennas.

16. The storage medium according to claim 13, wherein channel measurement result thresholds corresponding to different numbers of antennas are the same, and the same channel measurement result threshold corresponding to the different numbers of antennas corresponds to different PRACH resource sets.

17. The storage medium according to claim 13, wherein channel measurement result thresholds corresponding to different numbers of antennas are different, and the different channel measurement result thresholds corresponding to the different numbers of antennas correspond to different PRACH resource sets.

* * * * *